United States Patent [19]

Gimpel et al.

[11] Patent Number: 4,680,319

[45] Date of Patent: * Jul. 14, 1987

[54] ACCELERATED CROSSLINKING OF POLYOLEFINS GRAFTED WITH SILANES

[75] Inventors: Franco Gimpel, Via F. Nullo 18, 20129 Milano; Corrado Brichta, Milan, both of Italy

[73] Assignee: Franco Gimpel, Milan, Italy

[*] Notice: The portion of the term of this patent subsequent to Jul. 16, 2002 has been disclaimed.

[21] Appl. No.: 728,212

[22] Filed: Apr. 29, 1985

Related U.S. Application Data

[63] Continuation-in-part of Ser. No. 566,300, Dec. 28, 1983, abandoned.

[30] Foreign Application Priority Data

Dec. 12, 1983 [IT] Italy ............................... 24121 A/83
Apr. 27, 1984 [IT] Italy ............................... 20702 A/84

[51] Int. Cl.$^4$ ................................................ C08K 3/34
[52] U.S. Cl. ................................. 523/210; 522/66; 523/211; 524/450; 525/254; 525/288; 525/363
[58] Field of Search ............... 524/450; 525/254, 288, 525/363; 522/66; 523/210, 211

[56] References Cited

U.S. PATENT DOCUMENTS

| | | | |
|---|---|---|---|
| 4,003,701 | 1/1977 | Brickman | 523/300 |
| 4,183,844 | 1/1980 | Streck et al. | 523/209 |
| 4,289,860 | 9/1981 | Glander et al. | 525/288 |
| 4,499,230 | 2/1985 | Lockhart | 524/450 |
| 4,529,750 | 7/1985 | Gimpel | 524/450 |

Primary Examiner—Wilbert J. Briggs, Sr.
Attorney, Agent, or Firm—Stevens, Davis, Miller & Mosher

[57] ABSTRACT

Compositions based on silane-grafted olefin polymers which are cross-linkable after shaping and which contain from 0.1 to 10% by weight of crystalline zeolites in powder form and, preferably, also a cross-linking coagent consisting of an aryl-carboxilic acid and/or a cross-linking catalyst.

14 Claims, No Drawings

ACCELERATED CROSSLINKING OF POLYOLEFINS GRAFTED WITH SILANES

This is a continuation-in-part of application Ser. No. 566,300 filed Dec. 28, 1983, and now abandoned.

It is known to cross-link silane-modified polyolefins by exposing shaped articles, obtained by forming polyolefin, which have been modified by grafting silanes onto them, to the action of water in the form of, for example, warm water, steam or moist gases (British Pat. No. 1,286,460).

This process requires long cross-linking times due to the low rate of diffusion of water through the polymer. Further, shaped articles of only a very limited thickness can be obtained.

It is also known that silane-modified polyolefins can be cross-linked in the presence of a compound capable of liberating water when the compound is heated in the polymeric mass during shaping of the same (British Pat. No. 1,581,041).

This process, which attempts to avoid the above mentioned slow curing step during which the shaped article is exposed to moisture, has the disadvantage of releasing water in an uncontrolled manner while the polymer is heated to a high temperature. The polymer is therefore in a fluid state, and, consequently, the premature cross-linking adversely affects the followng shaping step.

It is also known to crosslink polyolefins, especially low density polyethylene, by means of peroxides combined with exposure to microwave radiation. This technique makes it possible to achieve certain advantages compared with thermal peroxide crosslinking such as, for example, a reduction in energy consumption and investment requirements, but has the same drawbacks as thermal peroxide crosslinking. On the one hand, the characteristics of the crosslinked shaped articles are unsatisfactory, especially due to the fact that they cannot be effectively stabilized to resist ageing at elevated temperatures, and the formed articles furthermore contain voids; and, on the other hand, the technique does not afford a satisfactory method for crosslinking high density polyethylene.

The present invention concerns compositions based on polyolefins which have been modified by grafting onto them hydrolysable unsaturated silanes containing zeolites in powder form and being shapeable into articles which can then be crosslinked by microwave radiation or by exposure to water in liquid or vapor phase or by heat.

With the process according to the present invention the shaped articles are crosslinked in a very short time and, especially in the case of crosslinking with microwave, are not limited to small thicknesses as is the case of the known processes for silane crosslinking.

In a particular embodiment of the present invention, crosslinking co-agents, consisting of arylcarboxylic acids, may also be used which are preferably carried on the zeolite.

The composition according to the invention can also comprise a known silanol condensation catalyst such as organic compounds of tin, e.g. dibutyltin dilaurate, zinc salts, e.g. zinc stearate; titanium alcolate, e.g. tetranormal butyl titanate, organic compounds of aluminum, e.g. mono hydroxi di-p tert butilbenzoate of aluminum and others. These silanol condensation catalysts are used in the present invention in the same amounts that are usual in known processes i.e. around 0.05% by weight on polymer, and they can be used, but not necessarily, in addition to the above mentioned crosslinking coagents.

The polyolefins to which the present invention is applicable include homopolymers and copolymers of ethylene and propylene such as, for example:

(a) high, medium and low density polyethylene;
(b) copolymers of ethylene and propylene and/or other mono olefins (for example Butene-1, Hexene-1);
(c) copolymers ethylene/vinylacetate or ethylene/acrylates; and
(d) thermoplastic rubbers consisting of ethylene-propylene copolymer or ethylene/propylene/diene terpolymer.

The olefin polymers or copolymers modified by grafting silanes onto them and which are used for the compositions covered by the present invention have a content of hydrolysable unsaturated silane of about 1–5% by weight, preferably 2–4% by weight.

The hydrolysable silanes to be used in accordance with the present invention are those generally used for the crosslinking of polyolefins according to known processes, such as, for example, vinyltrimethoxysilane, vinyltriethoxy silane, gamma methacryl-oxypropyl trimethoxy-silane, vinyl methyldimethoxysilane.

Suitable types of silanes are defined, for example, in U.S. Pat. No. 3,646,155.

The present invention makes it possible to crosslink polyolefins which have been grafted with unsaturated silanes, such as, for example, vinyl-tri(2-methoxy-ethoxy)silane, vinyl-tri(2-methoxy-propoxy)silane, which are more resistant to hydrolysis than those used in known crosslinking processes based on silanes, namely silanes which are stable to hydrolysis in the presence of water at room temperature. Preferred silanes having such characteristics are these represented by the formula:

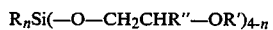

wherein n=1 or 2, R' is alkyl group having 1–4 C atoms, R" is H or CH$_3$, R is a monovalent unsaturated hydrocarbon radical or hydrocarbonoxy radical as described in the above mentioned U.S. Pat. No. 3,646,155. The polyolefins grafted with this type of silane are stable in storage and can be crosslinked later on after shaping in accordance with the present invention.

The term "zeolites" is meant to include crystalline aluminosilicates of one or more alkaline or alkaline-earth metals, as defined by D. W. Breck in "Zeolite Molecular Sieves", Wiley Interscience Editor (1974), pages 133–180.

Such zeolites correspond to the general formula:

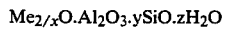

wherein:
Me is a metal, preferably an alkaline or alkaline earth metal;
x is the valence of the metal;
y is the SiO$_2$/Al$_2$O$_3$ ratio, which, for a same type of zeolite can vary within a certain range, such as e.g.:
   y=1.8–2.1 for zeolite A;
   y=2–3 for zeolite X;
   y=3–6 for zeolite Y;
   and for zeolites of certain types can be as high as 100;

z ranges from 0 to 9, according to the type of zeolite and to the hydration degree thereof.

The zeolites in powder form used according to the present invention can be hydrated and/or partly or totally dehydrated by thermal treatment, i.e., having the properties of "molecular sieves".

According to an embodiment of the present invention, hydrated zeolites may be used, which are thermally activated during the course of the processing of the polyolefinic material itself.

In particular cases such as, e.g., in the production of cross-linked foamed materials, hydrated zeolites may be used for promoting a pre-crosslinking during the thermo-forming step, conferring the necessary stiffness to the item.

The zeolites suitable in the polymeric composition according to the invention are, in particular, those selected from the following types:

Type A zeolites, e.g., 3A, 4A and 5A; Type 4A zeolite in its hydrated form is represented by the following typical formula:

$$Na_2O.Al_2O_3.2SiO_2.4,5H_2O$$

Na+ ions in tridimensional crystal lattice can be replaced by other cations, such as K+ (zeolite 3A) or Ca++ (zeolite 5A);

Type X zeolites and preferably zeolite NaX; Type X zeolites in their hydrated form are represented by the typical formula:

$$Na_2O.Al_2O_3.2.4SiO_2.6H_2O$$

(b) Type Y zeolites which, in their hydrated form, are represented by the typical formula:

$$Na_2O.Al_2O_3.4,8SiO_2.8.9H_2O$$

(c) Type P zeolite, having the same structure as synthetic Phillipsite as well as zeolite B, and which can be obtained according to the French Pat. No. 1,213,628

(d) Hydroxysodalite, represented by the formula:

$$Na_2O.Al_2O_3 0.2SiO_2.2.5H_2O.$$

Obviously, a mixture of said zeolites may be used. The particle distribution of the zeolite powders used in accordance with the present invention must be quite narrow so that at least 80% by weight of the aggregates has a dimension between 1 and 15 micrometers and preferably an average size around 2-4 micrometers (determined for instance by Coulter Count method).

The quantity of zeolite generally used is between 0.1% and 20% by weight on the olefin polymer and preferably between 0.5% and 10% by weight.

In accordance with a particular embodiment of the invention the zeolite may be added before the grafting step; and, in this case, a dehydrated zeolite or a mixture of hydrated and dehydrated zeolite is used. In this grafting step conventional grafting catalysts, such as organic peroxides, are used.

The grafting catalysts and also the crosslinking coagents, may be dissolved in the silane or in suitable solvents or supported on the zeolite: this last case being particularly advantageous also because it allows the additive to be more evenly dispersed and homogenized throughout the bulk of the molten polymer.

According to a further particulate embodiment, by using silane of the type stable to hydrolysis at room temperature, it is possible to prepare a mix, preferably in powder form, comprising polymer, silane, zeolite and other ingredients (crosslinking co-agent, catalysts and so on) which is stable to storage and through grafting by melt kneading, turns into the crosslinkable polymeric composition according to the invention.

The crosslinking co-agents capable of accelerating the crosslinking reaction are arylcarboxylic acids preferably adsorbed on zeolite, possibly in combination with known silanol condensation catalysts.

The arylcarboxylic acids are thermally stable at the highest temperature reached in the process of shaping the polymer compositions.

The quantity of arylcarboxylic acid with respect to the zeolite may be 1 to 25 parts by weight of acid for 100 parts by weight of zeolite or of mixture of zeolites, preferably 1 to 2 parts.

Suitable arylcarboxylic acids, which can be used, are given in U.S. Pat. Nos. 3,367,926 and 3,207,737 and are known, in the form of their salts, to exert a nucleating effect on crystalline polymers.

In this context the following acids may be listed:
p tert-butylbenzoic acid, benzoic acid, toluic acid, p ethoxy and p.methoxy benzoic acids, salycilic acid, naphthoic acid, dipenyl-propionic acid and phthalic acid.

The zeolite or the combination of the zeolite with the organic acid are incorporated into the polymer composition either directly or as a Masterbatch with polyolefin.

This Masterbatch may possibly also contain the conventional silanol condensation catalyst.

The shaping operation can be carried out by conventional thermoforming processes such as, for examples, by extrusion, extrusion-expanding with physical blowing agents, injection molding, and so on.

Thermo-formed articles are cross-linked, according to the present invention, by means of one of following processes:

(a) exposure to the action of moisture, as water, water vapor, or moist gases;
(b) Irradiation with electromagnetic microwaves having frequencies from $10^9$ to $10^{12}$ Hz.
(c) Action of heat supplied from the outside, or also from the inside by means of, e.g., the flow of electric current through the articles itself, with a preliminary suitable addition of an agent, e.g., of carbon black, capable of conferring the necessary electrical conductivity to it, or by means of the combination of a plurality of said processes.

The microwave exposure times which are required to effect crosslinking depend on the power transmitted, the concentration of zeolite in the shaped article and on the temperature of the shaped article when this is exposed to radiation. In fact it may be convenient to expose to radiation articles which have been pre-heated to a temperature which naturally depends on the type of polymer being processed and which generally is of the order of 100°. Generally an exposure time of a few minutes is sufficient.

Conventional microwave generators may be used such as those used for peroxide crosslinking of low density olefin polymers or thermoplastic rubbers such as, for example, ethylene-propylene copolymers and ethylene-propylene-diene ter-polymers.

The compositions in accordance with this invention may contain various additives such as antioxydants, stabilizers, fire retardants, blowing agents, fillers, pigments etc. as used in the known processes for crosslinking silane grafted polyolefins.

The compositions in accordance with the present invention allow the following advantages to be realized:
(a) crosslinking can be effected rapidly and with low investment cost
(b) shaped articles can be obtained without limitations to thickness
(c) dimensional stability of the articles after shaping
(d) absence of voids and porous areas
(e) the polyolefins can be grafted with silanes which are more resistant to hydrolysis than used in known processes so that a grafted polyolefin can be obtained which is stable when stored
(f) foamed articles can be obtained which are crosslinked after the foaming step
(g) low energy consumption.

The present invention is illustrated in the following examples which should not be considered to limit the application of said invention.

EXAMPLE 1

The following ingredients are uniformly mixed in a rapid mixer for two minutes:
100 parts by weight of low density polyethylene (LDPE) having MFI=4 (ASTM 1238/c) and density 0.927 g/ml
1.5 parts by weight of vinyl-tri(methoxy-ethoxy)-silane (silane A 172 producted by Union Carbide Corp.)
0.15 parts by weight of 2,5-dimethyl-2,5-di(ter.butyl)-peroxy-hexane
2.5 parts by weight of hydrated zeolite 4A powder (Sipernat 44 produced by Degussa)
1 part by weight of a dispersion consisting of 0.5 parts by dehydrated zeolite 3A powder (Baylith L produced by Bayer AG.) and 0.5 parts of castor oil
0.05 parts by weight of dibutyl-Sn-dilaurate.

The mixture is extruded in a Werner Pfeidler ZK 28 twin screw extruder at temperature of 150° to 210° C. obtaining a 1.5 mm thick tape. Specimens taken from the tape were soaked in water at 80° C. After 3 hours the crosslinking degree was measured through the insoluble gel content after xylene extraction. The result was 72% by weight of insoluble gel.

In a comparative test carried out under the same conditions except that no zeolite was added, no crosslinking (measured as insoluble gel) was observed after soaking the specimens in 80° C. water for 3 hours.

EXAMPLE 2

Crosslinkable specimens obtained as in Example 1 are preheated in an oven to about 100° C. and then placed in a microwave oven (Phillips type 2010 C from which the rotating plate has been removed). The specimens are exposed to radiation by microwaves having a frequency of 2450 MHZ and an out put powder of 2.1 KW for 4 minutes. After cooling the specimens, the insoluble gel content is measured as above and is found to be 70%.

EXAMPLE 3

100 parts by weight of silane grafted HDPE pellets having MFI=1 ASTM D 1238/F and nominal density 0.965 (trademark Polidan PEG 1/nat. T manufactured by Padanaplast), were mixed in a tumbler with 0.25 parts by weight of thermally activated 3A zeolite dispersed in 0.25 parts of castor oil (this dispersion is denominated Baylith L paste and is produced by Bayer A.G.). 0.05 parts of p.ter-butylbenzoic acid are then added. Mixing is continued for 20 minutes. The mixture is then processed in a twin screw extruder as in Example 1 and 1.5 thick tape specimen is obtained. Specimens taken from the tape were immersed in 80° C. water. After 3 hours the gel content was found to be 71%. In a comparative test carried out under the same conditions except that no zeolite was added, the gel content reached only 50% after immersion 80° C. water for 48 hours.

EXAMPLE 4

In a tumbler mixer:
100 parts by weight of basic resin constituted by ethylene/vinyl acetate copolymer (trademark Baylon V 10 H 432, manufactured by Bayer A.G., vinyl acetate content of 8.5%, density=0.928 g/cm$^3$; Melt Flow Index=1.5, according to DIN 53735);
1.5 parts by weight of stearic acid amide;
0.1 parts by weight of sulphur-containing phenolic antioxidant (trademark Irganox 1035 manufactured by Ciba Geigy),
are mixed, and then:
2.5 parts by weight of vinyltriethoxysilane (trademark A 151 manufactured by Union Carbide) wherein 0.21 parts by weight are added of dicumyl peroxide), are added thereto.

The blend is homogenized and granulated in a single screw extruder, L/D=25, screw diameter=60 mm, at temperatures of from 130° to 180° C.

95 parts by weight of said silanized pellets are mixed with 5 parts by weight of a masterbatch constituted by the same basic EVA resin, and containing, beside 3.45 parts of EVA,
1.5 parts by weight of zeolite 4A in powder form (trademark Sipernat 44 manufactured by Degussa);
0.05 parts by weight of dibutyltin dilaurate.

The blend is then fed to a double screw LMP-C27 extruder (L/D=16.6; diameter of the screws=90 mm) provided with a die with outlet section of inner diameter of 9.5 mm, and outer diameter of 12.5 mm. At about one-third of the length of the screw, 30 parts by weight are injected of a physical blowing agent constituted by dichlorotetrafluoroethane. The temperature of molten material at the outlet is of about 95° C. The tubular expanded article has the following characteristics:
Inner diameter: 35 mm
Outer diameter: 50 mm
Density: 38 kg/m$^3$ The expanded tubular item described has, immediately after having been expanded, a cross-linked degree, determined by extraction with a solvent according to IEC method, of 25%. After a week of conditioning in the ambient air, the cross-linking degree results to be of 65%.

We claim:
1. A composition crosslinkable by exposure to irradiation with electromagnetic microwaves or to water in liquid or vapor phasse, which comprises an olefin polymer having grafted thereon an unsaturated silane containing hydrolyzable groups, and 0.1 to 20% of a hydrated, partially dehydrated or dehydrated zeolite in powder form based on the weight of the olefin polymer.

2. A composition according to claim 1, wherein the zeolite is dehydrated.

3. A composition according to claim 1, wherein the zeolite is zeolite A, X, Y or P or hydroxysodalite.

4. A composition according to claim 1, wherein 80% by weight of the zeolite consists of aggregates having a dimension between 1 and 15 micrometers.

5. A composition according to claim 1, wherein the silane has the general formula $R_nSi(-O-CH_2CH_2R''-OR')_{4-n}$ wherein n = 1 or 2, R' is an alkyl group having 1-4 C atoms, R'' is H or $CH_3$ and R is a monovalent unsaturated hydrocarbon or hydrocarbonoxy radical.

6. A composition according to claim 1, comprising 1 to 25 parts of an arylcarboxylic acid crosslinking co-agent per 100 parts by weight of zeolite.

7. A composition according to claim 6, wherein the arylcarboxylic acid is supported on the zeolite.

8. A storage stable, crosslinkable composition prepared by melt kneading a mixture comprising an olefin polymer, an unsaturated silane containing hydrolyzable groups, 0.1 to 20% of a hydrated, partially dehydrated or dehydrated zeolite in powder form based on the weight of the olefin polymer, a grafting catalyst and a crosslinking catalyst.

9. A composition according to claim 8, wherein the zeolite is dehydrated.

10. A composition according to claim 8, wherein the zeolite is zeolite A, X, Y or P or hydroxysodalite.

11. A composition according to claim 8, wherein 80% by weight of the zeolite consists of aggregates having a dimension between 1 and 15 micrometers.

12. A composition according to claim 8, wherein the silane has the general formula $R_nSi(-O-CH_2CH_2R''-OR')_{4-n}$ wherein n = 1 or 2, R' is an alkyl group having 1-4 C atoms, R'' is H or $CH_3$ and R is a monovalent unsaturated hydrocarbon or hydrocarbonoxy radical.

13. A composition according to claim 8, comprising 1 to 25 parts of an arylcarboxylic acid crosslinking co-agent per 100 parts by weight of zeolite.

14. A composition according to claim 13, wherein the arylcarboxylic acid is supported on the zeolite.

* * * * *